United States Patent
Ahn et al.

(10) Patent No.: US 9,977,559 B2
(45) Date of Patent: May 22, 2018

(54) DISPLAY DEVICE

(71) Applicant: Samsung Display Co., Ltd., Yongin, Gyeonggi-Do (KR)

(72) Inventors: Soon Sung Ahn, Yongin (KR); Hyoung Wook Jang, Yongin (KR)

(73) Assignee: SAMSUNG DISPLAY, CO., LTD. (KR)

( * ) Notice: Subject to any disclaimer, the term of this patent is extended or adjusted under 35 U.S.C. 154(b) by 0 days. days.

(21) Appl. No.: 14/811,584

(22) Filed: Jul. 28, 2015

(65) Prior Publication Data
US 2016/0117026 A1 Apr. 28, 2016

(30) Foreign Application Priority Data
Oct. 24, 2014 (KR) .................. 10-2014-0145304

(51) Int. Cl.
| | |
|---|---|
| G06F 3/041 | (2006.01) |
| G06F 3/044 | (2006.01) |
| G06F 3/0354 | (2013.01) |
| H05K 7/00 | (2006.01) |
| H01F 17/00 | (2006.01) |
| H01J 31/12 | (2006.01) |
| G06F 3/046 | (2006.01) |

(52) U.S. Cl.
CPC .................... *G06F 3/046* (2013.01)

(58) Field of Classification Search
CPC ........ G06F 3/048; G06F 3/0412; G06F 3/046; G06F 3/044; F21V 9/14; H01J 1/316
See application file for complete search history.

(56) References Cited

U.S. PATENT DOCUMENTS

| | | | |
|---|---|---|---|
| 5,912,531 A * | 6/1999 | Hasegawa | H01J 31/127 313/309 |
| 7,663,607 B2 | 2/2010 | Hotelling et al. | |
| 8,274,488 B2 | 9/2012 | Bae | |
| 9,176,622 B1 * | 11/2015 | Jin | G06F 3/0416 |
| 2003/0127704 A1 * | 7/2003 | Kobayashi | H01F 17/0006 257/531 |
| 2007/0018969 A1 | 1/2007 | Chen et al. | |
| 2007/0285389 A1 * | 12/2007 | Ito | G06F 3/03545 345/158 |
| 2008/0303774 A1 | 12/2008 | Yoshinaga et al. | |
| 2011/0025639 A1 | 2/2011 | Trend et al. | |
| 2011/0279397 A1 | 11/2011 | Rimon et al. | |
| 2012/0306824 A1 | 12/2012 | Horie | |
| 2013/0106769 A1 | 5/2013 | Bakken et al. | |
| 2013/0120257 A1 * | 5/2013 | Park | G06F 3/041 345/158 |

(Continued)

FOREIGN PATENT DOCUMENTS

| | | | |
|---|---|---|---|
| JP | 2005-173709 | 6/2005 | |
| JP | 2008/04222 | * 4/2008 | G06F 3/046 |

(Continued)

*Primary Examiner* — Lin Li
(74) *Attorney, Agent, or Firm* — Innovation Counsel, LLP

(57) ABSTRACT

Provided herein is a display device including a display unit for displaying an image, the display unit including light emitting regions; a touch sensor arranged on a rear surface of the display unit; and a coil unit arranged on a front surface of the display unit, and including a plurality of auxiliary coils.

17 Claims, 3 Drawing Sheets

(56) References Cited

U.S. PATENT DOCUMENTS

| | | | | |
|---|---|---|---|---|
| 2013/0271161 A1* | 10/2013 | Solven | | G06F 3/041 |
| | | | | 324/661 |
| 2013/0314625 A1* | 11/2013 | Tsai | | G06F 3/044 |
| | | | | 349/12 |
| 2014/0002413 A1* | 1/2014 | Kim | | G06F 3/0416 |
| | | | | 345/174 |
| 2014/0028626 A1* | 1/2014 | Maeda | | G06F 3/0416 |
| | | | | 345/174 |
| 2014/0049882 A1* | 2/2014 | Lin | | H05K 7/00 |
| | | | | 361/679.01 |
| 2014/0139761 A1* | 5/2014 | Yanagawa | | G06F 3/044 |
| | | | | 349/12 |
| 2014/0204043 A1* | 7/2014 | Lin | | G06F 3/0416 |
| | | | | 345/173 |
| 2014/0333574 A1* | 11/2014 | Xi | | G06F 3/046 |
| | | | | 345/174 |
| 2015/0002446 A1* | 1/2015 | Ayzenberg | | G06F 3/044 |
| | | | | 345/174 |
| 2015/0070305 A1* | 3/2015 | Seo | | G06F 3/0412 |
| | | | | 345/174 |
| 2015/0128078 A1* | 5/2015 | Oh | | G06F 3/0484 |
| | | | | 715/766 |
| 2015/0205033 A1* | 7/2015 | Hong | | F21V 9/14 |
| | | | | 345/87 |

FOREIGN PATENT DOCUMENTS

| | | | | |
|---|---|---|---|---|
| JP | 200804222 | * | 4/2008 | ............ G06F 3/046 |
| JP | 2008084222 | * | 4/2008 | |
| KR | 10-2007-0012277 | | 1/2007 | |
| KR | 10-2012-0135468 | | 12/2012 | |

* cited by examiner

DISPLAY DEVICE

CROSS-REFERENCE TO RELATED APPLICATION

This application claims priority to and the benefit of Korean Patent Application No. 10-2014-0145304, filed on Oct. 24, 2014, in the Korean Intellectual Property Office, the entire contents of which are incorporated herein by reference in their entirety.

BACKGROUND

Field

Various embodiments of the present disclosure relate to a display device that includes a touch sensor.

Description of Related Art

A touch sensor is a sensor that is configured to sense a touch motion of a user. Since it can substitute for additional input devices such as a keyboard and mouse etc., it is being widely used in mobile devices, and its usage is expanding.

Such a touch sensor may be attached to a display panel that displays an image and may perform a function of sensing touches.

There are various types of touch sensors: capacitive touch sensors, inductive touch sensors, and resistive touch sensors.

Inductive touch sensors are used to sense touches performed by a stylus with precision.

SUMMARY

According to an embodiment, there is provided a display device including a display unit for displaying an image, the display unit including light emitting regions; a touch sensor arranged on a rear surface of the display unit; and a coil unit arranged on a front surface of the display unit, and including a plurality of auxiliary coils.

The plurality of auxiliary coils may be in a floating state.

The plurality of auxiliary coils may be spiral inductors.

Each of the plurality of auxiliary coils may be a parallelogram helical coil.

The parallelogram helical coil may include a pad connected to one end of the parallelogram helical coil.

The other end of the parallelogram helical coil maybe connected to the pad.

The parallelogram helical coil may form a closed loop.

The plurality of auxiliary coils may be circular helical coils.

The circular helical coil may include a pad connected to one end of the circular helical coil.

The other end of the circular helical coil may be connected to the pad.

The circular helical coil may form a closed loop.

The touch sensor may be an inductive touch sensor.

The display unit may include a plurality of pixels.

The plurality of auxiliary coils may not overlap with the light emitting regions.

Each of the plurality of auxiliary coils may have a helical structure.

The coil unit may further include a plurality of pads each connected to the auxiliary coils.

Each of the plurality of auxiliary coils may form a closed loop.

The touch sensor may include a plurality of driving coils, and a plurality of sensing coils disposed such that they intersect the driving coils.

The touch sensor may further include a driver configured to supply a driving current to the driving coils, and a controller configured to receive a signal being output from the sensing coils.

At least a portion of the auxiliary coils may be disposed between the light emitting regions.

The pixels may be disposed between the auxiliary coils.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present between two elements. Like reference numerals refer to like elements throughout.

DETAILED DESCRIPTION

Figure 1:
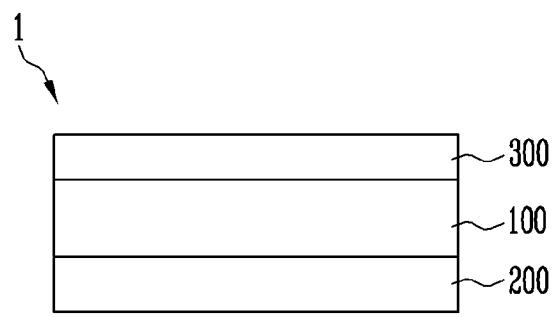
FIG. 1 is a view illustrating a display device according to an embodiment of the present disclosure.

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Figure 2:
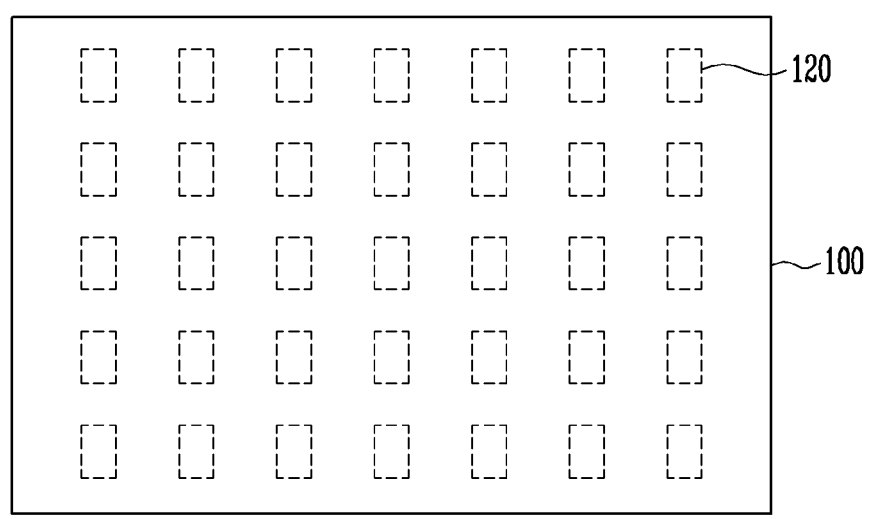
FIG. 2 is a view illustrating a display unit according to an embodiment of the present disclosure.

FIG. 1 is a view illustrating a display device according to an embodiment of the present disclosure, and FIG. 2 is a view illustrating a display unit according to an embodiment of the present disclosure.

Especially, FIG. 1 illustrates a layered structure of a display unit 100, touch sensor 200 and coil unit 300 included in a display device 1.

Referring to FIG. 1, the display device 1 according to an embodiment of the present disclosure may include a display unit 100, touch sensor 200, and coil unit 300.

The display unit 100 may perform a function of displaying an image, and for this purpose, may include a plurality of light emitting regions of pixels 120.

Herein, the light emitting regions of pixels 120 may emit light in certain colors. For example, each of the light emitting regions of pixels 120 may emit light primary colors such as red, green, blue etc.

The number of the light emitting regions of pixels 120 may vary depending on a size or resolution and so forth of the display unit 100.

Furthermore, the display unit 100 may further include driving circuits (not illustrated) for controlling the light emitting regions of pixels 120.

The touch sensor 200 may be arranged on a rear surface of the display unit 100. By forming the touch sensor 200 on the rear surface of the display unit 100, the display device may have increased luminance as compared to the display device having the touch sensor on the front surface of the display unit 100.

For example, the display unit 100 and the touch sensor 200 may be attached to each other through an additional adhesive layer.

Herein, the touch sensor 200 may sense a touch event that occurs in the display device 1.

For example, a user may generate a touch event on an upper side of the coil unit 300 using a stylus or finger and so forth.

Herein, the touch sensor 200 may detect a location of the generated touch event.

Figure 3:
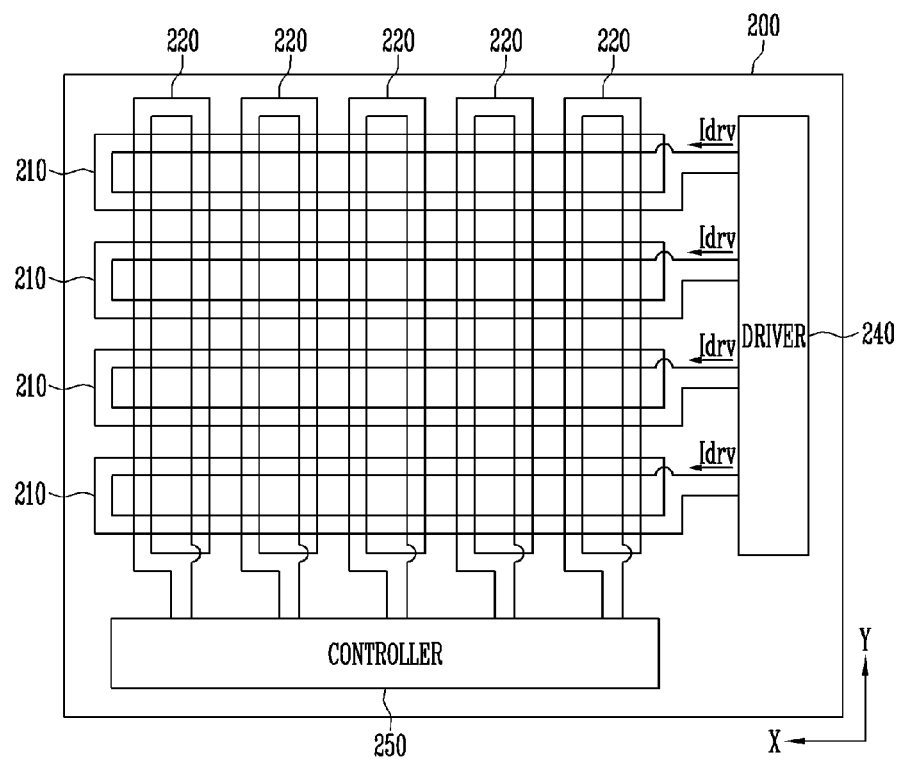
FIG. 3 is a view illustrating a touch sensor according to an embodiment of the present disclosure.

FIG. 3 is a view illustrating a touch sensor according to an embodiment of the present disclosure.

The touch sensor 200 according to the embodiment of the present disclosure may be an inductive touch sensor.

For example, the touch sensor 200 according to the embodiment of the present disclosure may include a plurality of driving coils 210 and a plurality of sensing coils 220.

The driving coils 210 and sensing coils 220 may be disposed such that they intersect each other.

For example, each of the driving coils 210 may extend along a first direction (for example, X axis direction).

Furthermore, the driving coils 210 may be arranged along a second direction (for example, Y axis direction) that intersects the first direction.

Herein, each of the driving coils 210 may have a shape of a loop.

For example, as illustrated in FIG. 3, each of the driving coils 210 may have a shape of a multiple loop.

Furthermore, each of the driving coils 210 may have a shape of a single loop.

For example, each of the sensing coils 220 may extend along the second direction.

Furthermore, the sensing coils 220 may be arranged along the first direction intersecting the second direction.

Herein, each of the sensing coils 220 may have a shape of a loop.

For example, as illustrated in FIG. 3, each of the sensing coils 220 may have a shape of a multiple loop.

Furthermore, each of the sensing coils 220 may have a shape of a single loop.

The number of the driving coils 210 and the sensing coils 220 may vary depend on the sensing accuracy needed.

The touch sensor 200 according to the embodiment of the present disclosure may further include a driver 240 and controller 250.

The driver 240 may supply a driving current (Idrv) to the driving coils 210.

For example, the driver 240 may sequentially supply the driving current (Idrv) having a predetermined current value to the driving coils 210.

The driving current (Idrv) may flow along a path formed by the driving coil 210. Accordingly, a certain magnetic field may be formed around the driving coil 210.

The controller 250 may receive a signal being output from the sensing coils 220, and may detect a touch event using the received signal.

When a touch event occurs by the stylus, a change of magnetic field occurs in the sensing coil 220 to which the stylus is approached or touched, and accordingly, a current flowing in the corresponding sensing coil 220 changes as well.

Therefore, the controller 250 may detect a location of the touch event using the current signal being detected in the sensing coils 220.

Furthermore, the controller 250 may perform a function of controlling an operation of the driver 240 together with a function of detecting a touch event.

The touch sensor 200 may include a coil unit 300 on the front surface of the display unit 100 to ensure a detection of a touch event that causes no change or extremely little change in the magnetic field (for example, a touch event by a finger). Without the coil unit 300, the touch sensor may not detect a touch event by a finger.

Accordingly, the display device 1 according to the embodiment of the present disclosure may be configured to detect all various kinds of touch events by having the coil unit 300.

Figure 4:
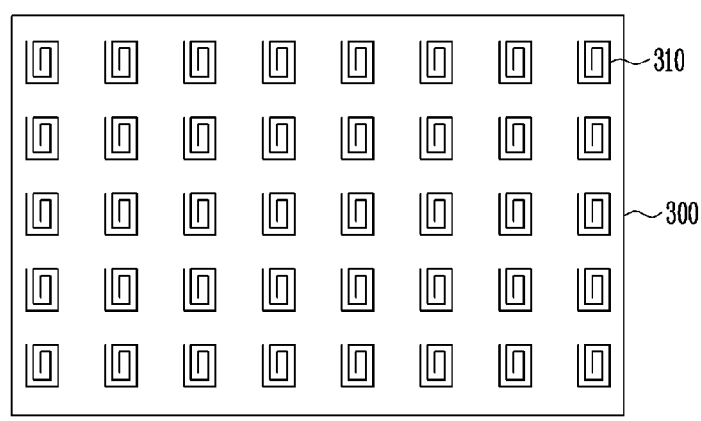
FIG. 4 is a view illustrating a coil unit according to an embodiment of the present disclosure.

FIG. 4 is a view illustrating a coil unit 300 according to an embodiment of the present disclosure.

Referring to FIG. 1, the coil unit 300 according to the embodiment of the present disclosure may be arranged on a front surface of the display unit 100.

For example, the display unit 100 and the coil unit 300 may be attached to each other through an additional adhesive layer.

Accordingly, when the display unit 100 displays an image on the front surface, the user may see the image through the coil unit 300.

Referring to FIG. 4, the coil unit 300 according to an embodiment of the present disclosure may include a plurality of auxiliary coils 310.

The plurality of auxiliary coils 310 may be arranged such that they are spaced apart from one another, and each of the auxiliary coils 310 may be in a floating state.

The plurality of auxiliary coils 310 may be spiral inductors. The spiral inductors may be parallelogram helical coils. Furthermore, each of the auxiliary coils 310 may have a circular structure, spiral structure or helical structure.

Furthermore, when the user touches the front surface of the coil unit 300 using a finger, a capacitance is generated between the user's finger and an auxiliary coil 310 adjacent to the finger, and a magnetic field between the auxiliary coil 310 and the sensing coils 220 changes as well.

Accordingly, the controller 250 may recognize a location of the touch using a signal being output from the sensing coils 220.

Figure 5:
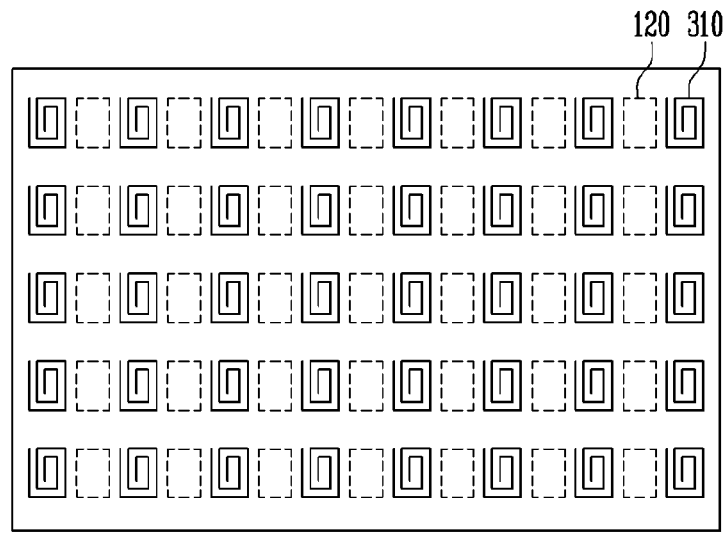
FIG. 5 is a view illustrating an arrangement between auxiliary coils and pixels according to an embodiment of the present disclosure.

FIG. 5 is a view illustrating an arrangement between auxiliary coils and pixels according to an embodiment of the present disclosure.

That is, FIG. 5 illustrates overlapped view of the coil unit 300 and the display unit 100.

When the display unit 100 outputs an image on a front surface side, there is concern that the aperture ratio of the display device 1 may be deteriorated by the coil unit 300 disposed on the front surface of the display unit 100.

Therefore, as illustrated in FIG. 5, the auxiliary coils 310 included in the coil unit 300 may be disposed such that they do not overlap light emitting regions of the pixels 120 included in the display unit 100.

For this purpose, at least a portion of the auxiliary coils 310 may be disposed between the light emitting regions of pixels 120.

Furthermore, the light emitting regions of pixels 120 may be disposed between the auxiliary coils 310.

FIGS. 6a to 6d are views illustrating auxiliary coils according to another embodiment of the present disclosure.

Figure 6A:
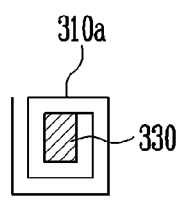
FIGS. 6A, 6B, 6C, 6D and 6E are views illustrating auxiliary coils according to another embodiment of the present disclosure.

First, referring to FIG. 6a, the coil unit 300 according to an embodiment of the present disclosure may further include a plurality of pads 330.

Herein, each of the auxiliary coils 310a may be connected to a pad 330.

For example, as illustrated in FIG. 6A, a pad 330 may be disposed inside of an auxiliary coil 310a having a helical structure and one end of the auxiliary coil 310a may be connected to the pad 330.

Figure 6C:
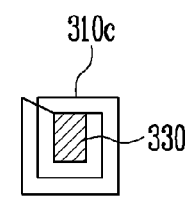
Figure 6B:
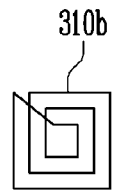

Furthermore, as illustrated in FIG. 6B, an auxiliary coil 310b according to another embodiment of the present disclosure may form a closed loop.

For example, one end and the other end of the auxiliary coil 310b may be connected to each other.

As illustrated in FIG. 6C, the auxiliary coil 310c according to another embodiment of the present disclosure may be connected to a pad 330 and at the same time form a closed loop.

For example, one end of the auxiliary coil 310c may be connected to the other end and the pad 330 may be connected to the one end of the auxiliary coli 310c at the center of the auxiliary coil.

Figure 6D:
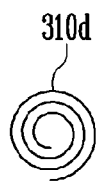

Meanwhile, referring to FIG. 6D, the auxiliary coil 310d according to another embodiment of the present disclosure may have a circular helical structure having a circular helical coil, which is different from the auxiliary coil 310 having a parallelogram helical structure illustrated in FIGS. 4 and 5. Both ends of the circular helical coil 310d may be connected to each other to form a closed loop. The circular helical structure may further include a pad at the center of the circular helical structure.

Figure 6E:
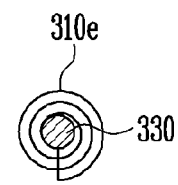

As illustrated in FIG. 6E, the auxiliary coil 310e according to another embodiment of the present disclosure may be connected to a pad 330 and at the same time form a closed loop.

For example, one end of the auxiliary coil 310e may be connected to the other end and the pad 330 may be connected to the one end of the auxiliary coli 310e at the center of the auxiliary coil.

An inductive touch sensor may sense a touch by a stylus that causes change in a magnetic field.

According to an embodiment of the present disclosure, it is possible to provide a display device that is capable of sensing a touch event that may cause little or no change in a magnetic field by providing a coil on the front surface of the display unit. Thus, the display device may detect a touch event by not only a stylus but a finger.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device comprising:
   a display panel for displaying an image, the display panel including a plurality of light emitting regions of pixels;
   a touch sensor arranged on a rear surface of the display panel; and
   a coil arranged on a front surface of the display panel and including a plurality of auxiliary coils,
   wherein the touch sensor comprises a plurality of driving coils, and a plurality of sensing coils disposed such that they intersect the driving coils,
   wherein a capacitance is generated between a user's finger and at least one of the plurality of auxiliary coils adjacent to the finger and a magnetic field between the plurality of auxiliary coils and the plurality of sensing coils is changed when the user touches a front of the coil using the finger, and
   wherein the plurality of auxiliary coils are disposed between the plurality of light emitting regions of pixels not to overlap with the light emitting regions of pixels in a plan view.

2. The display device according to claim 1,
   wherein the plurality of auxiliary coils are arranged in a matrix configuration and are in a floating state.

3. The display device according to claim 2,
   wherein the plurality of auxiliary coils are spiral inductors.

4. The display device according to claim 3,
wherein each of the plurality of auxiliary coils is a parallelogram helical coil.

5. The display device according to claim 4,
wherein the parallelogram helical coil comprises a pad connected to one end of the parallelogram helical coil.

6. The display device according to claim 5,
wherein the other end of the parallelogram helical coil is connected to the pad.

7. The display device according to claim 4,
wherein the parallelogram helical coil forms a closed loop.

8. The display device according to claim 3,
wherein the plurality of auxiliary coils are circular helical coils.

9. The display device according to claim 8,
wherein the circular helical coil comprises a pad connected to one end of the circular helical coil.

10. The display device according to claim 9,
wherein the other end of the circular helical coil is connected to the pad.

11. The display device according to claim 8,
wherein the circular helical coil forms a closed loop.

12. The display device according to claim 1,
wherein the touch sensor is an inductive touch sensor.

13. The display device according to claim 1,
wherein each of the plurality of auxiliary coils has a helical structure.

14. The display device according to claim 1,
wherein the coil further comprises a plurality of pads each connected to the auxiliary coils.

15. The display device according to claim 1,
wherein each of the plurality of auxiliary coils forms a closed loop.

16. The display device according to claim 1,
wherein the touch sensor further comprises a driver configured to supply a driving current to the driving coils, and a controller configured to receive a signal being output from the sensing coils.

17. The display device according to claim 1,
wherein each of the plurality of driving coils include a plurality of first portions extending along a first direction and the plurality of sensing coils include a plurality of second portions extending along a second direction, and
wherein the plurality of first portions and the plurality of second portions intersect each other more than twice.

* * * * *